US011651087B2

(12) United States Patent
Chan

(10) Patent No.: US 11,651,087 B2
(45) Date of Patent: May 16, 2023

(54) ELECTRONIC DEVICE AND METHOD FOR CONTROLLING THE DEVICE IN A LOST MODE

(71) Applicant: Yi-Chih Chan, New Taipei (TW)

(72) Inventor: Yi-Chih Chan, New Taipei (TW)

( * ) Notice: Subject to any disclaimer, the term of this patent is extended or adjusted under 35 U.S.C. 154(b) by 46 days.

(21) Appl. No.: 17/353,479

(22) Filed: Jun. 21, 2021

(65) Prior Publication Data

US 2022/0269799 A1 Aug. 25, 2022

(30) Foreign Application Priority Data

Feb. 24, 2021 (TW) .................................. 110106499

(51) Int. Cl.
*G06F 21/60* (2013.01)
*G06F 21/32* (2013.01)
*G06F 21/78* (2013.01)
*G06Q 20/38* (2012.01)
*G06F 21/57* (2013.01)

(52) U.S. Cl.
CPC ............ *G06F 21/604* (2013.01); *G06F 21/32* (2013.01); *G06F 21/577* (2013.01); *G06F 21/78* (2013.01); *G06Q 20/389* (2013.01); *G06F 2221/2141* (2013.01); *G06F 2221/2147* (2013.01)

(58) Field of Classification Search
CPC .................. G06F 21/604; G06F 21/78; G06F 2221/2141; G06F 2221/2147
See application file for complete search history.

(56) References Cited

U.S. PATENT DOCUMENTS

2012/0242686 A1* 9/2012 Umealu ............... H04N 5/2723
345/629
2019/0018987 A1* 1/2019 Pai .......................... G06F 21/88

\* cited by examiner

*Primary Examiner* — Ellen Tran
(74) *Attorney, Agent, or Firm* — Hamre, Schumann, Mueller & Larson, P.C.

(57) ABSTRACT

A method for controlling an electronic device that is in communication with the server includes: in response to a lost mode activation signal from the server, controlling the electronic device to switch to a lost mode in which the electronic device is controlled to output a message that includes contact information of an owner of the electronic device, and an offer of a monetary compensation associated with recovery of the electronic device by the owner; and in response to determination that an unlock condition has been met, controlling the electronic device to switch to a normal mode.

13 Claims, 2 Drawing Sheets

ELECTRONIC DEVICE AND METHOD FOR CONTROLLING THE DEVICE IN A LOST MODE

CROSS-REFERENCE TO RELATED APPLICATION

This application claims priority of Taiwanese Patent Application No. 110106499, filed on Feb. 24, 2021.

FIELD

The disclosure relates to a portable electronic device, and a method and a computer program product for controlling the portable electronic device when the portable electronic device is lost.

BACKGROUND

Portable electronic devices (e.g., mobile phones) are in extensive use and are held by almost all people nowadays. As such, losing a portable electronic device is not uncommon. Recovery of a lost portable electronic device typically involves another party who found the lost portable electronic device (known as a finder), tried to contact an owner of the electronic device, and/or brought the lost portable electronic device to a lost-and-found office. However, in some occasions, the finder may simply keep possession of the lost portable electronic device or leave the lost portable electronic device untended.

SUMMARY

Therefore, an object of the disclosure is to provide a method for controlling a portable electronic device that is lost, so as to facilitate its recovery.

According to one embodiment of the disclosure, the method is for includes controlling a portable electronic device that includes a processor and that is in communication with a server. The method is implemented by the processor, and includes:

in response to receipt of a lost mode activation signal from the server, controlling the portable electronic device to switch to a lost mode, in which the portable electronic device is controlled to output a message that includes
  contact information of an owner of the portable electronic device, and
  an offer of a monetary compensation associated with recovery of the portable electronic device by the owner; and
in response to determination that an unlock condition has been met, controlling the electronic device to switch to a normal mode.

Another object of the disclosure is to provide an electronic device that is configured to implement the above-mentioned method.

According to one embodiment of the disclosure, the portable electronic device includes:
  a data storage that stores a software application therein;
  an output unit;
  a communication unit that is configured to communicate with a server; and
  a processor coupled to the data storage, the output unit and the communication unit, the processor being programmed to execute the software application to:
    in response to receipt of a lost mode activation signal from the server, control the portable electronic device to switch to a lost mode, in which the output unit is controlled to output a message that includes contact information of an owner of the electronic device, and an offer of a monetary compensation associated with recovery of the portable electronic device by the owner; and
    in response to determination that an unlock condition has been met, control the portable electronic device to switch to a normal mode.

Another object of the disclosure is to provide a computer program product stored in a non-transitory computer-readable storage medium. When executed by a processor of an electronic device, the computer program product causes the processor to implement steps of the above-mentioned method.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
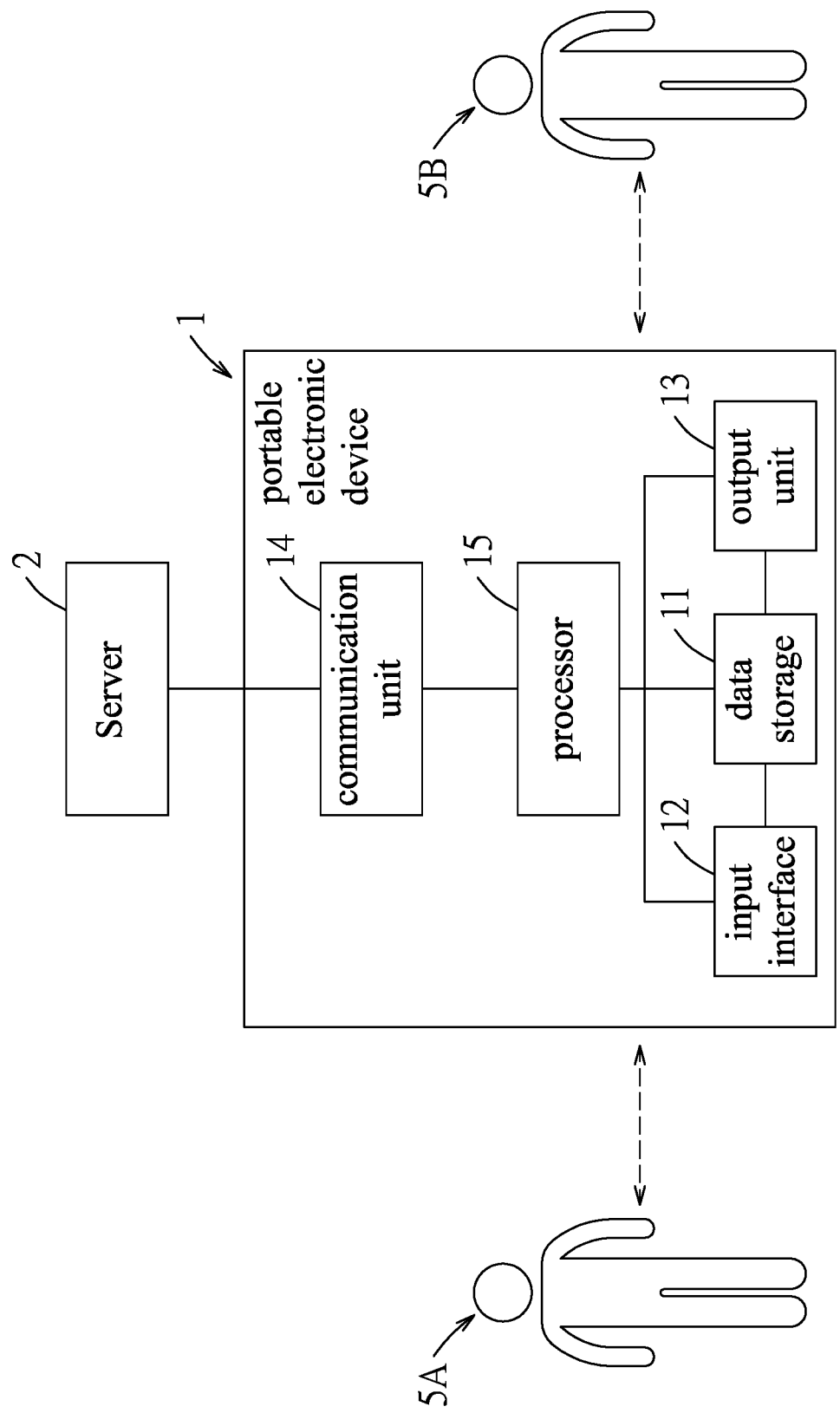
FIG. 1 is a block diagram illustrating a system according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" may refer to a direct connection among a plurality of electrical apparatus/devices/equipments via an electrically conductive material (e.g., an electrical wire), or an indirect connection between two electrical apparatus/devices/equipments via another one or more apparatus/device/equipment, or wireless communication.

FIG. 1 is a block diagram illustrating a system according to one embodiment of the disclosure. In this embodiment, the system includes a portable electronic device 1 and a server 2 that are capable of communication with each other.

The portable electronic device 1 may be embodied using a smart phone, a laptop, a tablet, etc., and includes a data storage 11, an input interface 12, an output unit 13, a communication unit 14 and a processor 15. The processor 15 is coupled to the data storage 11, the input interface 12, the output unit 13 and the communication unit 14 for controlling operations thereof.

The processor 15 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The data storage 11 may be embodied using a machine- or computer-readable storage medium of a memory such as random access memory (RAM), read only memory (ROM), programmable ROM (PROM), firmware, flash memory, or any combination thereof. In this embodiment, the data storage 11 stores a software application which may cause the processor 15, when executed by the processor 15, to implement a method for controlling the portable electronic device 1.

The input interface 12 may include a keyboard, a mouse, a touch screen, and/or other input mechanisms that enable a person to input information so as to interact with the portable electronic device 1. The output unit 13 may include a display screen for displaying information, and/or an audio output unit (e.g., a speaker) for outputting audio, etc. In this embodiment, the input interface 12 and the output unit 13 may be integrated using a touch screen.

The communication unit 14 may include at least one of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G) and/or fifth generation (5G) of wireless mobile telecommunications technology, and/or the like. The communication unit 14 may be controlled to establish a connection with the server 2, and therefore the portable electronic device 1 and the server 2 are able to transmit information with each other.

The server 2 may be embodied using one or more server devices, and stores data associated with a number of users owning various portable electronic devices, such as an owner of the portable electronic device 1 of this embodiment (referred to as an owner 5A). Specifically, the data associated with the owner 5A includes an account number of an owner account associated with the owner 5A, and a monetary balance of the owner account. The owner account may be, for example, a physical or virtual bank account of the owner 5A. The owner 5A of the portable electronic device 1 may operate the portable electronic device 1 beforehand to associate the owner account to the portable electronic device 1. For example, the owner 5A may operate the portable electronic device 1 to access a website provided by the server 2 to complete a registration process, and input the account number of the owner account during the registration process. The owner 5A may deposit money in the owner account using conventional means (e.g., bank transfer, credit card, cash, etc.). In some embodiments, the money deposited in the owner account (i.e., the monetary balance) may be set as earmarked balance, meaning that the owner of the owner account may be prevented from withdrawing money from the owner account.

Figure 2:
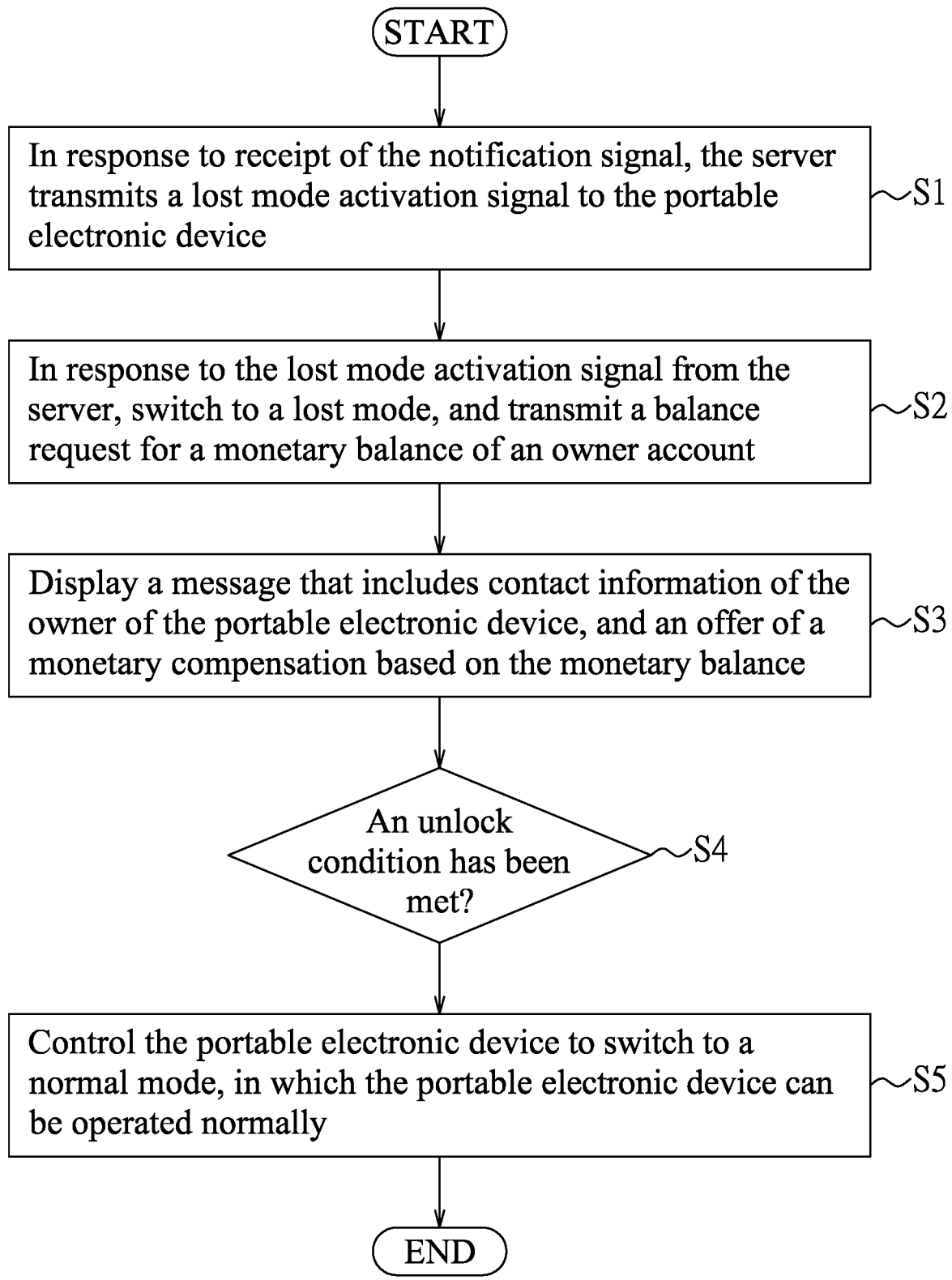
FIG. 2 is a flow chart illustrating steps of a method for controlling a portable electronic device according to one embodiment of the disclosure.

FIG. 2 is a flow chart illustrating steps of a method for controlling a portable electronic device according to one embodiment of the disclosure. In this embodiment, the method is implemented by the system as described in FIG. 1.

In use, when the portable electronic device 1 owned by the owner 5A becomes lost (i.e., the owner 5A does not have possession of the portable electronic device 1), the owner 5A may operate another electronic device (not shown), e.g., a desk computer, a personal computer, a tablet computer, a laptop, a smart phone, etc., to establish a connection with the server 2 and to transmit to the server 2 a notification signal indicating that the portable electronic device 1 is lost (by, for example, logging into a website provided by the server 2 to confirm the identity of the owner 5A, followed by submitting a notification that the portable electronic device 1 is lost on the website). The another electronic device may be owned by the owner 5A or other parties.

In response to receipt of the notification signal, the server 2 transmits a lost mode activation signal to the portable electronic device 1 (which is, at this stage, lost) in step S1.

In step S2, in response to the lost mode activation signal from the server 2, the processor 15 of the portable electronic device 1 controls the portable electronic device 1 to switch to a lost mode, and transmits a balance request for a monetary balance of the owner account associated with the owner 5A to the server 2. In response to receipt of the balance request, the server 2 transmits, to the processor 15, the monetary balance of the owner account that is stored therein and that is associated with the owner 5A.

After receiving the monetary balance, in step S3, the processor 15 controls the display screen of the output unit 13 to display a message that includes contact information of the owner 5A of the portable electronic device 1, and an offer of a monetary compensation based on the monetary balance. Specifically, the monetary compensation is offered to a third party who discovers the portable electronic device 1 (hereinafter referred to as a finder 5B), and the processor 15 may determine an amount of the monetary compensation, which is at most the exact amount of the monetary balance and may be other amounts or a predetermined amount. In this embodiment, the amount of the monetary compensation is equal to the amount of the monetary balance. In some embodiments, the amount of the monetary compensation is equal to a predetermined percentage of the amount of the monetary balance. For example, the amount of the monetary compensation is $100 USD, or, based on a location of the portable electronic device 1, other appropriate amount in an appropriate currency such as $3000 NTD.

In use, the message may be controlled to be continuously displayed by the display screen, and may be in the form of "An offer of $100 USD compensation for someone who helps with recovery of this device; please enter your account number", along with the contact information of the owner 5A of the portable electronic device 1.

The display screen may be controlled to display an input field for enabling the finder 5B to input an account number of a receiving account for receiving the monetary compensation. It is noted that in the lost mode, the processor 15 may disable access of some or all content stored in the data storage 11 of the portable electronic device 1. That is to say, other than inputting the account number, the finder 5B may be prohibited to otherwise operate the portable electronic device 1 in any way, including opening, editing and deleting data stored in the portable electronic device 1, and storing data into the portable electronic device 1.

Afterward, the finder 5B may proceed to return the portable electronic device 1 to the owner 5A, or to take the portable electronic device 1 to an appropriate authority (e.g., a police station, a lost-and-found office, etc.).

After the owner 5A successfully recovers the portable electronic device 1, he/she may operate the portable electronic device 1 to initiate an unlocking process.

Specifically, in this embodiment, the display screen may be controlled to display an initiation button, and after the owner 5A presses the initiation button, displays an instruction to instruct the user (i.e., the owner 5A) to enter an owner-associated input via the display screen. The owner-associated input may include one or more of a predefined gesture or a set of handwriting strokes (e.g., a signature inputted via the display screen), a password that may include alphabet characters, numbers, etc., and a pre-stored biometric input (e.g., a fingerprint) associated with the owner 5A. When the processor 15 determines that the owner-associated input is authentic (i.e., the owner 5A has indeed recovered the electronic device 1), the processor 15 initiates the unlocking process.

In other embodiments, the owner 5A may operate another electronic device to transmit an initiation request to the server 2, and in turn, the server 2 would transmit an initiation signal to the portable electronic device 1, and the portable electronic device 1 would then instruct the user to enter an owner-associated input via the display screen.

In step S4, the processor 15 determines whether an unlock condition has been met. When the determination is affirmative, the flow proceeds to step S5, in which the processor 15 controls the portable electronic device 1 to switch to a normal mode, in which the portable electronic device 1 can be operated normally. Otherwise, the flow goes back to step S3, and the portable electronic device 1 remains in the lock mode.

Specifically, in this embodiment, since the portable electronic device 1 is found by the finder 5B who entered the account number of the receiving account associated with him/her, the unlock condition may include that transfer of the monetary compensation from the owner account of the owner 5A to the receiving account has been successfully processed.

As such, after the processor 15 determines that the owner-associated input is authentic, the processor 15 generates a request for the transfer from the owner account of the owner 5A to the receiving account, and transmits the request to the server 2. Specifically, the request for the transfer includes the account number of the receiving account.

In response to receipt of the request for the transfer, the server 2 may be configured to process the transfer of the monetary compensation from the account of the owner 5A to the receiving account. The transfer of the monetary compensation may be processed in a commercially available manner, such as via a bank service server. After the transfer has been successfully processed, the server 2 may transmit an indication to the portable electronic device 1.

In response to receipt of the indication that the transfer of the monetary compensation has been successfully processed, the processor 15 determines that the unlock condition has been met, and subsequently controls the portable electronic device 1 to switch to the normal mode.

It is noted that in other embodiments, the processor 15 may be programmed to determine that the unlock condition has been met when it is determined that the owner-associated input is authentic. That is, the electronic device 1 maybe switched to the normal mode as soon as the correct owner-associated input is received.

In the case that the owner 5A himself/herself recovers the portable electronic device 1 (i.e., the unlocking process is initiated without the account number of the receiving account being inputted), the processor 15 may be programmed to determine that the unlock condition has been met when it is determined that the owner-associated input is authentic. That is, the portable electronic device 1 may be switched to the normal mode as soon as the correct owner-associated input is received.

According to one embodiment, there is provided a computer program product stored in a non-transitory computer-readable storage medium and including instructions. When executed by a processor of an electronic device, the instructions of the computer program product cause the processor to implement steps of the method as illustrated in FIG. 2. The non-transitory computer-readable storage medium may be embodied in the form of a cloud storage, a compact disk, a flash drive, etc.

To sum up, embodiments of the disclosure provide a method for controlling a portable electronic device that is lost. In the method, the lost portable electronic device may first be remotely controlled to switch to the lost mode, in which the portable electronic device is controlled to display a message that includes the contact information of an owner of the portable electronic device and an offer for monetary compensation. After the portable electronic device is recovered, the processor of the portable electronic device may proceed to initiate a transfer of the monetary compensation from the owner account of the owner to a receiving account inputted by a finder. In this manner, with the added incentives, the lost portable electronic device may become more probable to being recovered.

In the description above, for the purposes of explanation, numerous specific details have been set forth in order to provide a thorough understanding of the embodiments. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for controlling a portable electronic device that includes a processor and that is in communication with a server, the method being implemented by the processor and comprising:

in response to receipt of a lost mode activation signal from the server, controlling the portable electronic device to switch to a lost mode, in which the portable electronic device is controlled to output a message that includes:
   contact information of an owner of the portable electronic device, and
   an offer of a monetary compensation associated with recovery of the portable electronic device by the owner;

in response to determination that an unlock condition has been met, controlling the electronic device to switch to a normal mode;

transmitting a balance request for a monetary balance of an account associated with the owner to the server; and controlling a display screen of the portable electronic device to display the offer of the monetary compensation based on the monetary balance, wherein the unlock condition includes that a transfer of the monetary compensation from the account of the owner has been successfully processed.

2. The method of claim 1, further comprising:

in response to receipt of an account number of a receiving account and afterward an owner-associated input via an input interface of the portable electronic device, generating a request for the transfer from the account of the owner to the receiving account;

transmitting the request for the transfer to the server; and in response to receipt of an indication that the transfer of the monetary compensation has been successfully processed from the server, determining that the unlock condition has been met.

3. The method of claim 1, wherein in the lost mode, the processor controls a display screen of the portable electronic device to display the message.

4. The method of claim 1, wherein, in response to receipt of an owner-associated input via an input interface of the portable electronic device, the processor determines that the unlock condition has been met when it is determined that the owner-associated input is authentic.

5. The method of claim 4, wherein the owner-associated input includes a predefined gesture, a password, a pre-stored biometric input, or a combination thereof.

6. The method of claim 1, wherein in the lost mode, the processor further disables access of content stored in the portable electronic device.

7. A non-transitory computer-readable storage medium that stores a computer program product therein, wherein the computer program product includes instructions that, when executed by a processor of an electronic device, cause the processor to implement steps of the method of claim 1.

8. A portable electronic device comprising:
a data storage that stores a software application therein;
an output unit;
a communication unit that is configured to communicate with a server;
a processor coupled to said data storage, said output unit and said communication unit; and
a display screen coupled to said processor,
wherein said processor is programmed to execute the software application to:
in response to receipt of a lost mode activation signal from the server, control the portable electronic device to switch to a lost mode, in which said output unit is controlled to output a message that includes contact information of an owner of the electronic device, and an offer of a monetary compensation associated with recovery of the portable electronic device by the owner;

in response to determination that an unlock condition has been met, control the portable electronic device to switch to a normal mode;

transmit a balance request for a monetary balance of an account associated with the owner to the server; and control said display screen to display the offer of the monetary compensation based on the monetary balance, wherein the unlock condition includes that a transfer of the monetary compensation from the account of the owner has been successfully processed.

9. The portable electronic device of claim 8, further comprising an input interphase coupled to said processor, wherein said processor is further programmed to:

in response to receipt of an account number of a receiving account and afterward an owner-associated input via said input interface, generate a request for the transfer from the account of the owner to the receiving account;

transmit the request for the transfer to the server; and in response to receipt of an indication that the transfer of the monetary compensation has been successfully processed from the server, determine that the unlock condition has been met.

10. The portable electronic device of claim 8, further comprising a display screen coupled to said processor, wherein in the lost mode, said processor controls said display screen to display the message.

11. The portable electronic device of claim 8, further comprising an input interface coupled to said processor, wherein, in response to receipt of an owner-associated input via said input interface, said processor determines that the unlock condition has been met when it is determined that the owner-associated input is authentic.

12. The portable electronic device of claim 11, wherein the owner-associated input includes a predefined gesture, a password, a pre-stored biometric input, or a combination thereof.

13. The portable electronic device of claim 8, wherein in the lost mode, said processor further disables access of content stored in said data storage.

* * * * *